(12) United States Patent
Bishop-Moser et al.

(10) Patent No.: US 11,402,356 B2
(45) Date of Patent: Aug. 2, 2022

(54) OBJECT IDENTIFICATION SYSTEM AND METHOD

(71) Applicant: Provenance Laboratories LLC, Encino, CA (US)

(72) Inventors: Joshua Bishop-Moser, Santa Monica, CA (US); Anton Abugov, Beverly Hills, CA (US); Alexander Klachin, Encino, CA (US); Anya Goldin, Encino, CA (US)

(73) Assignee: Provenance Laboratories LLC, Encino, CA (US)

( * ) Notice: Subject to any disclaimer, the term of this patent is extended or adjusted under 35 U.S.C. 154(b) by 0 days.

(21) Appl. No.: 17/116,434

(22) Filed: Dec. 9, 2020

(65) Prior Publication Data

US 2021/0181163 A1   Jun. 17, 2021

Related U.S. Application Data

(60) Provisional application No. 62/947,230, filed on Dec. 12, 2019.

(51) Int. Cl.
*G01N 29/44* (2006.01)
*G01N 21/17* (2006.01)
*G01N 29/24* (2006.01)
*G01N 29/04* (2006.01)

(52) U.S. Cl.
CPC ..... *G01N 29/4427* (2013.01); *G01N 21/1702* (2013.01); *G01N 29/041* (2013.01); *G01N 29/2418* (2013.01); *G01N 2021/1706* (2013.01)

(58) Field of Classification Search
CPC ............. G01N 29/4427; G01N 29/041; G01N 29/2418; G01N 29/262; G01N 29/4436; G01N 2291/0423; G01N 2021/1706; G01N 21/1702
See application file for complete search history.

(56) References Cited

U.S. PATENT DOCUMENTS

| | | | |
|---|---|---|---|
| 5,325,167 A | 6/1994 | Melen et al. | |
| 5,454,045 A | 9/1995 | Perkins et al. | |
| 7,353,709 B2 | 4/2008 | Kruger | |
| 7,942,058 B2 | 5/2011 | Turner et al. | |
| 8,175,820 B2 | 5/2012 | Hatanaka | |
| 8,210,045 B2 | 7/2012 | Caron | |
| 8,943,325 B2 | 1/2015 | Boutant et al. | |

(Continued)

FOREIGN PATENT DOCUMENTS

| | | |
|---|---|---|
| CN | 104330475 | 2/2015 |
| TW | 200641339 | 12/2006 |
| WO | 2009/073014 A1 | 6/2009 |

*Primary Examiner* — Suman K Nath
(74) *Attorney, Agent, or Firm* — DLA Piper LLP (US)

(57) ABSTRACT

A system and method for authentication of objects, which includes directing a laser beam onto a surface of an object to induce a thermoelastic excitation in bulk material of the object without altering the surface of the object, wherein the laser beam is pulsed. A surface ultrasonic wave at the surface of the object caused by the thermoelastic excitation is detected using a detector. A detection signal is generated using the detected surface ultrasonic wave. Digital data is generated using the detection signal. Authenticity of the object is determined by comparing the digital data and reference data stored in a database.

17 Claims, 5 Drawing Sheets

(56) References Cited

U.S. PATENT DOCUMENTS

| | | |
|---|---|---|
| 9,220,415 B2 | 12/2015 | Mandelis |
| 9,348,026 B2 | 5/2016 | Armbruster |
| 9,683,972 B2 | 6/2017 | Domke et al. |
| 2003/0078681 A1 | 4/2003 | Dubois |
| 2010/0053618 A1* | 3/2010 | Nakajima ............ A61B 5/0095 |
| | | 356/432 |
| 2017/0108472 A1* | 4/2017 | Fischer ................. G01N 29/32 |
| 2019/0331757 A1 | 10/2019 | Motzer |

* cited by examiner

OBJECT IDENTIFICATION SYSTEM AND METHOD

RELATED APPLICATIONS

This application claims the benefit of U.S. Provisional Application No. 62/947,230, filed Dec. 12, 2019, and which is incorporated herein by reference.

FIELD OF THE INVENTION

The present invention relates to authentication, forgery detection, and counterfeit detection of physical objects. More particularly, it relates to such authentication and detection based on nondestructive evaluation of the unique microscopic structure of each object.

BACKGROUND OF THE INVENTION

Providing authentication, detecting forgery, detecting counterfeiting, and/or ensuring a positive identification of an object all rely on proving that an object is exactly the same as the one originally created. This challenge applies to disciplines across collectibles, art, medicine, manufactured goods, artifacts, jewelry, and numerous other sectors. In many of these sectors, the detection method preferably is nondestructive, such that the original object is not harmed, altered, or destroyed in the inspection process.

Existing methods for providing authentication, detecting forgery, detecting counterfeiting, and/or ensuring a positive identification of an object are lacking in their ability to provide a nondestructive method that can ensure with virtual certainty that an object's characteristics match or do not match those stored in a database. The present invention provides a solution that overcomes these challenges.

BRIEF SUMMARY OF THE INVENTION

The aforementioned problems and needs are addressed by an authentication method that includes directing a laser beam onto a surface of an object to induce a thermoelastic excitation in bulk material of the object without altering the surface of the object, wherein the laser beam is pulsed, detecting a surface ultrasonic wave at the surface of the object caused by the thermoelastic excitation, generating a detection signal using the detected surface ultrasonic wave, generating digital data using the detection signal, and determining an authenticity of the object by comparing the digital data and reference data stored in a database.

An apparatus for analyzing an object having a bulk material and a surface includes a laser configured to generate a laser beam for inducing thermoelastic excitation in the bulk material upon impinging the surface of the object without altering the surface of the object, wherein the laser beam is pulsed, a detector configured to detect a surface ultrasonic wave at the surface of the object caused by the thermoelastic excitation, and to generate a detection signal using the detected surface ultrasonic wave, a processor configured to generate digital data using the detection signal, and a database configured to determine an authenticity of the object by comparing the digital data and reference data stored in the database.

Other objects and features of the present invention will become apparent by a review of the specification, claims, and appended figures.

DETAILED DESCRIPTION OF THE INVENTION

The present invention leverages the uniqueness of a material's microstructure that forms an object. For most microstructures, other than those with very few grains, there is no known way to clone, replicate, recreate, or reproduce the microstructure. While the microstructure and elemental composition of the surface of an object may change due to environmental effects, abrasion, oxidation and other effects, the internal structure remains stable. This combination of stability and inability to be duplicated provides an ideal basis for identification used for determining an authenticity of an object (i.e., determine the object is authentic such that it is the same object as previously interrogated, or determine the object is not authentic such that it is a different object or even a forgery).

For objects of at least a certain size, ultrasound is the ideal way to interrogate microstructures below the surface of an object with sufficient detail. This leads to the use of ultrasound as the ideal interrogation method. However, conventional sonogram technology is not ideal because the physical contact of probes to the surface may be restricted for inspection and risks damage to the object. Additionally, traditional sonogram technology leads to difficulty in exciting exact positions of surfaces, especially on complex surfaces. Certain surface geometries are not conducive to traditional sonogram technologies. Further, traditional sonogram technology is limited in its ability to create simultaneous broadband excitation across the frequency spectrum.

It has been discovered that laser stimulated ultrasound provides reliable performance exceeding those of conventional identification techniques. Laser stimulated ultrasound uses laser pulses to generate rapid local heating of the object, which creates a thermoelastic shock wave that propagates both along the surface of the object and through the bulk material of the object. The thermoelastic bulk wave generates an ultrasonic response that is altered by the microstructure of the material below the surface of the object. The shock wave is broadband, generating excitation across a range of frequencies, thus enabling a broad interrogation of the object with a spectrum from deep penetrating low frequency excitation to high frequency excitation that interrogates smaller feature sizes. The power, wavelength, spot size, and pulse duration of the laser beam are configured to generate thermoelastic excitation without ablating the material (i.e., without altering the surface of the object), thus providing nondestructive interrogation. Furthermore, the noncontact nature of laser excitation and detection ensures no damage is done due to physical contact of the probe on the object's surface. Furthermore, a wide range of surface geometries can be interrogated without necessarily needing contact probes.

Figure 1:
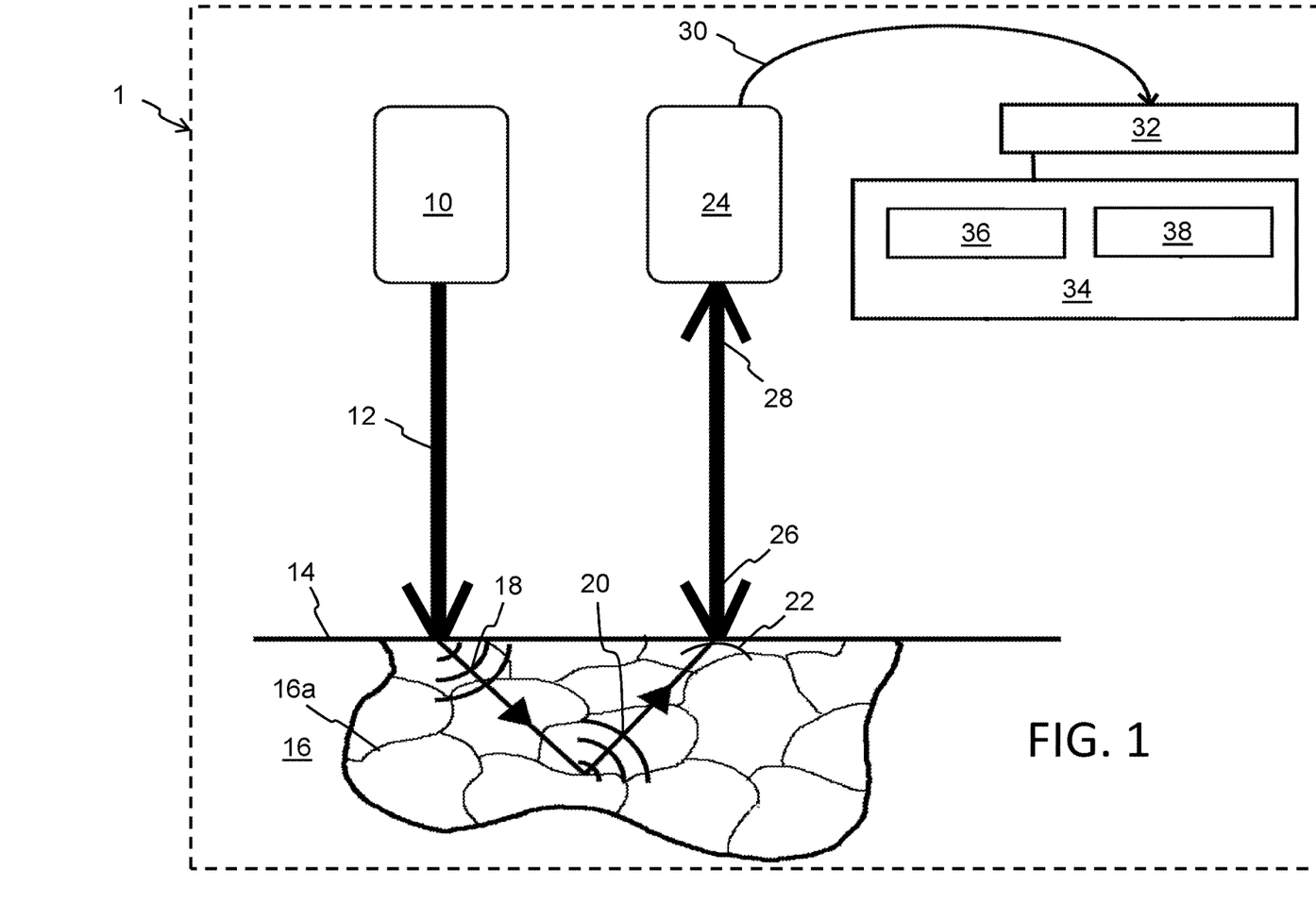
FIG. 1 is a schematic diagram of the identification system of the present invention.

FIG. 1 illustrates the components of the identification system 1 for analyzing an object. A laser source 10 (e.g., a nanosecond pulsed fiber laser, a picosecond pulsed fiber laser, or a femtosecond pulsed fiber laser) produces a pulsed laser (excitation) beam 12. The pulsed laser beam 12 is directed to the surface 14 of an object 16, where the pulsed laser beam 12 impinges on and interacts with the object 16 to create a thermoelastic bulk wave 18 that travels through and interacts with microstructure 16a of the object's material. Those interactions generate ultrasonic reflection waves 20 that travel back to the surface 14 of the object 16. While FIG. 1 shows a single ultrasonic reflection wave 20 from a single microstructure boundary 16a, it should be appreciated that many such reflections from different depths and locations within the object's material are created and reach back to the surface of the object. This means that the amplitude of the overall ultrasonic waveform at any point on the object's surface 14 (referred to herein as the surface ultrasonic wave 22) is a combination (summation) of all the ultrasonic reflection waves 20 within the object reaching that point on the object's surface 14.

The amplitude of the surface ultrasonic wave 22 is measured by a detector 24 at one or more discrete locations. Detector 24 is preferably an interferometer that uses the Sagnac effect and is illuminated by a super luminescent diode. A detection laser beam 26 from the interferometer is directed at the surface 14 of the object 16, and the vibration amplitude and frequency of the surface ultrasonic wave 22 are extracted from the interference of the frequency of the light 28 from the detection laser beam 26 bouncing off (i.e. by reflection and/or by scattering) due to the motion of the surface. Specifically, a ring interferometer can be used to create an interference pattern that compares the relative phases of light traveling in each direction around the loop. A laser Doppler vibrometer (LDV), which is a well-known scientific instrument that is used to make non-contact vibration measurements of a surface, may also be used as detector 24. A detection laser beam 26 from the LDV is directed at the surface 14 of the object 16, and the vibration amplitude and frequency are extracted from the Doppler shift of the frequency of the light 28 from the detection laser beam 26 bouncing off (i.e. by reflection and/or by scattering) due to the motion of the surface. Specifically, a vibrometer is generally a two beam laser interferometer that measures the frequency (or phase) difference between an internal reference beam and the light 28 bouncing off the object's surface 14. The most common types of lasers in an LDV is the helium-neon laser, although laser diodes, fiber lasers, and Nd:YAG lasers are also used. The detection laser beam 26 is directed to the object surface 14, and bounced light 28 from the object surface 14 is collected by the detector 24 and interfered with the reference beam on a photodetector, typically a photodiode. The output of the photodetector is a standard frequency modulated (FM) signal, with the Bragg cell frequency as the carrier frequency, and the Doppler shift as the modulation frequency. This signal can be demodulated to derive the velocity vs. time of the vibrating target. The output of the detector is a detection signal 30 that generally is a continuous analog voltage signal that is proportional to the velocity component of the surface ultrasonic wave 22 along the direction of the detection laser beam 26. While FIG. 1 shows a single laser source 10 and a single detector 24, one or more laser sources 10 can be used with one or more detectors 24 simultaneously. The position of the one or more laser sources 10 relative to the surface 14 can be stationary or moving, in combination with the position of the one or more detectors 24 relative to the surface 14 can be stationary or moving, where measurements are taken at one or more discrete locations on the surface 14.

Detection signal 30 is provided to a signal processor 32, which digitizes and/or otherwise processes the detection signal 30 into digital data suitable for digital processing and storage, whereby the digital data is then preferably stored as interrogation data 36 (for a subsequent interrogation of the object 16 to determine its authenticity) or as reference data 38 (for an initial interrogation of the object 16) in a database 34. Authentication or forgery detection is then enabled because the same object will have the same internal microstructure away from the surface 14, thus interrogation as described above using ultrasound will produce a substantially similar response in terms of detection signal. This response is seen in the spatial variation of the surface ultrasonic wave 22 as reflected in the detection signal 30. Other non-microstructural properties such as meso-scale cracks, voids, porosity, composition variation, and inclusions can also contribute to the uniqueness of the detection signal 30 for any given object 16. The ultrasonic response of the thermoelastic wave to the grain structure and boundaries is especially important for determining if the object 16 is the same as the one from which the reference data 38 was originally produced.

Figure 2:
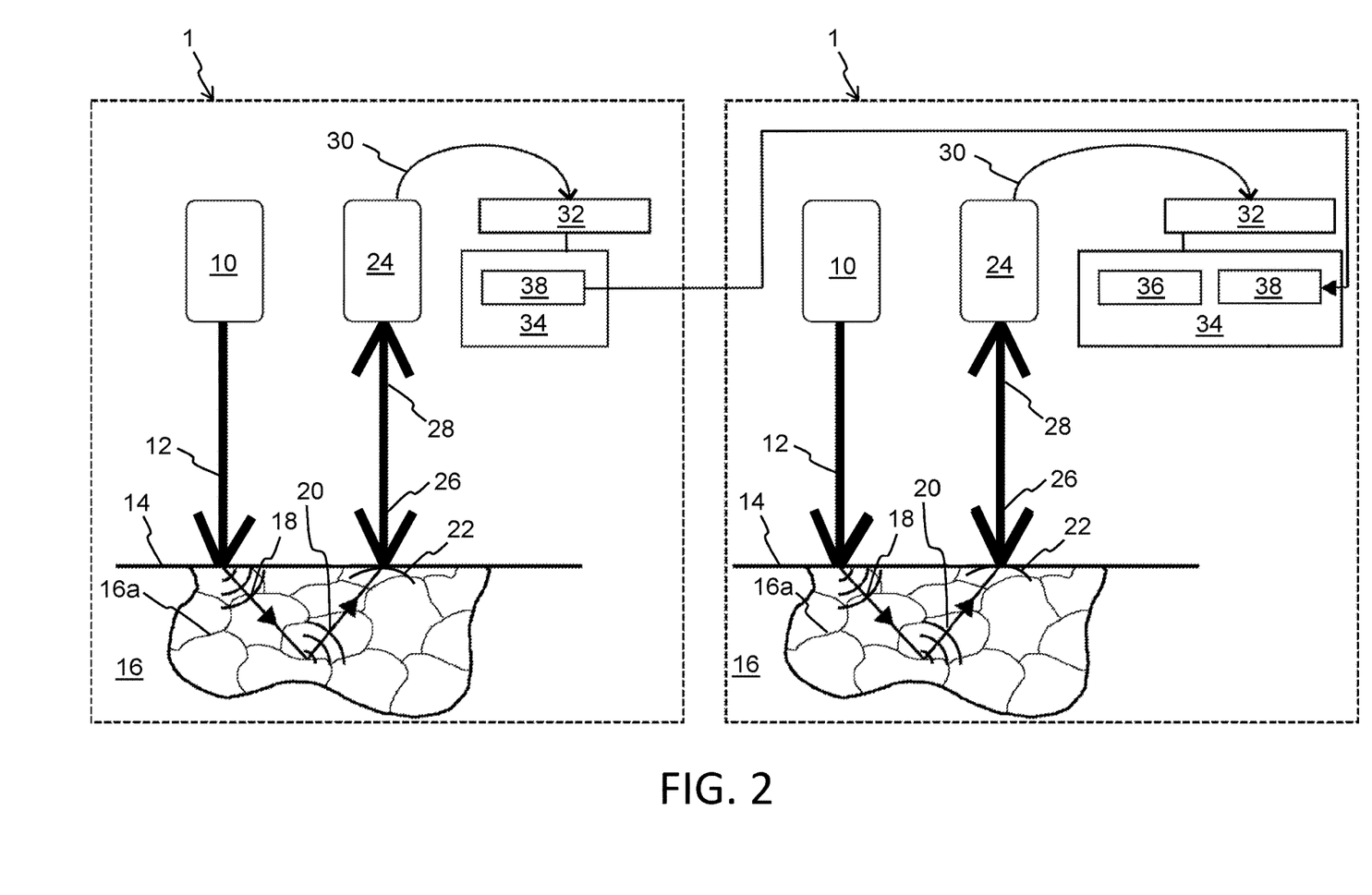
FIG. 2 is a schematic diagram showing the generation of reference data and the subsequent generation of interrogation data.

The reference data 38 in the database 34 can be generated from any interrogation that was performed at an earlier time than a subsequent interrogation. This earlier time can be the previous interrogation, or when more than two interrogations have been performed, any earlier interrogation or combination of earlier interrogations may be used. FIG. 2 conceptually shows the initialization interrogation on the left where the reference data 38 is created and stored, and the subsequent authentication interrogation on the right where the interrogation data 36 is created and compared to the reference data 38 to determine authentication. As shown, the identification system 1 used to create the reference data need not have stored any interrogation data 36. The authentication system 1 used to create the reference data 38 can physically be the same or physically be different than the authentication system 1 used to create the interrogation data 36. If they are physically different systems, then the reference data 38 of one database 34 can be transferred to the database 34 of the other system performing the subsequent interrogation. Alternately, a single database 34 can be physically separate from different laser sources 10, detectors 24 and processors 32 used to collect the reference and interrogation data 38/36.

Authentication is then determined if the difference(s) between the interrogation data 36 and the reference data 38 are below one or more thresholds, whereby the database 34 is configured to provide a determination that authentication is confirmed when the difference(s) are below the threshold(s), and a determination that authentication is not confirmed when the difference(s) are above the threshold(s). Specifically, the determination of sameness of the object 16 may use threshold values, variable threshold values that depend on scan parameters, deep learning or machine learning interpretation, human interpretation, statistical correlation methods, or any combination of these methods and other similar analytical techniques. The interrogation and reference data 36/38 may be graphically displayed and compared. Examples of methods for analysis and/or comparison include principle component analysis, multiple regression, binned histograms, scale-invariant feature transform, speed up robust feature technique, robust independent elementary features, rotated robust independent elementary features, local energy-based shape histograms, gradient location and orientation histograms, structural similarity index, histogram of oriented gradients, Haar-like features, eigenvalue analysis, wavelet-based analyses, spectral decomposition, and/or mean square error. These examples are presented as illustrative and do not represent a comprehensive set of techniques that may be used alone or in combination.

The grain boundaries and their respective locations are used directly or indirectly through their interactions with the thermoelastic bulk wave 18 resulting in the ultrasonic reflection waves 20, the sum of which is detected as the surface ultrasonic wave 22 which is used to generate the interrogation and reference data 36/38. Therefore, while the exact locations of the grain boundaries, the orientations of the grain boundaries, the shapes of the grain boundaries, the orientations of the grain lattice, the locations of the grain structures, and any combination of these attributes, may not be determined with precision, they do provide a repeatable effect as reflected in the interrogation and reference data 36/38 as unique markers for the object 16. The data about the grain structure does not need to be complete to provide enough data for authentication or forgery detection.

The grain boundaries and effect of the grain structure on the ultrasound waves can be determined using a pitch-catch configuration for the laser ultrasound laser beam 12 and detector beam 26 (or transducer 46 described below). The portion of detection signal 30 or the interrogation/reference data 36/38 that relates only to internal grain boundaries can be extracted from the surface wave 22 by analyzing the data to select only the frequencies that correspond to grain boundary feature sizes. The range for reliably detecting grain boundaries is approximately 20 MHz and higher. Spectral decomposition and spectral bracketing can be used to extract portions of the detection signal 30 or the interrogation/reference data 36/38 that are associated with desired spectral ranges Applying a filter (e.g. a high pass filter) that keeps the portion of the detection signal 30 or the interrogation/reference data 36/38 associated with being above a specified threshold (e.g., 20 Mhz) can be used. Collecting multiple recordings as the detector 24 is moved relative to a stationary excitation source and deconvoluting these recordings improves the resolution and/or repeatability of the grain boundary information. Collecting multiple recordings as the detector 24 is altered in angle relative to the surface 14 (i.e., collecting light 28 bouncing off the surface at two or more discrete angles relative to the surface 14) and deconvoluting these multi-angle recordings also improves the resolution and/or repeatability of the grain boundary information. Rapid change in velocity of the wave through the material indicates a grain boundary. Edge detection, clustering, and numerous other techniques can be applied to identify these rapid changes in velocity.

The laser based ultrasound interrogation may be performed with a single pulse, multiple pulses, or a continuous application of pulses at a set or variable frequency. Any permutation of these pulse modes may be used. The laser source 10 may be Q-switched, mode-locked, pulsed pumped, or use other means of creating a pulsed output. The laser beam 12 may be single wavelength, broadband, or have a select wavelength range or set of ranges. These pulses may be fixed on a specific point, scanned over a line, scanned over a region, or scanned over multiple points, lines, or regions, where these locations are discrete from each other. Any permutation of these locations may be used. For authentication and forgery detection, recording and storage in the database of the location that is scanned on the object (e.g., as part of the reference/interrogation data 38/36) provides useful information for enabling accurate integration of the same region of the object. The selection of points may be entirely stochastic, partially stochastic, or deterministic.

The relationship between acoustic velocity with material elasticity and density may be used to understand material properties from the ultrasonic reflection. Additionally, the relationship between acoustic attenuation with acoustic scatter and absorption may be used to understand material properties from the ultrasonic reflections. The location and time of features of the waveform of the surface ultrasonic wave 22 may be used to determine location along the surface and the depth of material features. These waveforms may be combined along the planes that are parallel to or perpendicular to the surface of the object, sometimes referred to as B-scans and C-scans. The combination of one or more property of excitation location(s), detection location(s), detection angle(s), acoustic velocity, acoustic attenuation, material properties, and time of acoustic travel may be used to interpret the interrogation for microstructure, material properties, and/or interrogation characteristics.

One manifestation of the present invention is to use a challenge-response protocol for authentication determination. A set of points, lines, or regions are interrogated, and their responses are recorded as reference data 38. Then, a subset of these points, lines, or regions is used on a subsequent interrogation to determine the similarity of the ultrasonic response. The subset that is interrogated can include just some of, or the entire set of, points, lines, or regions. The selection of points may be entirely stochastic, partially stochastic, or deterministic. Additionally, subsets of each region investigated may be used as the challenge. The digital data obtained from the interrogation provides the response in the challenge-response authentication protocol. The response should be within one or more thresholds of similarity in order to make the determination that the object subjected to the subsequent interrogation is authentic.

The surface of an object is often subject to environmental aging, abrasive wear, dust and dirt collection, chemical damage, and numerous other factors that alter the material structure, composition, or location of an object's surface. Interrogating below the surface according to the present invention enables access to regions that are not affected by surface altering factors. Excluding from the detection signal 30 some or all of the contribution from the actual surface 14 from initial interrogation or analysis may provide an improved ability to compare interrogations of the same region at different points in time. The depth of the surface effects varies based on material, environment, and object properties, but is often in the range of a few atoms to 1000 microns.

The use of non-ablative laser induced ultrasound for interrogation can be combined with any other methods to provide enhanced resolution, additional information, or contextual information. One or more other methods can be used in combination at the same time or at a different point in time. These methods can interrogate the same points, lines, or regions as the non-ablative laser induced ultrasound or different points, lines or religions, or a combination thereof. These additional methods can be destructive in nature or nondestructive or a combination thereof. The methods include combinations with probe-based ultrasound, including the potential use of one or more phased array transducers. Ablative laser ultrasound can be combined with non-ablative laser ultrasound, with the ablative laser ultrasound used in a destructive manner or with a sacrificial layer that is ablated. Additional methods that can be combined with non-ablative laser induced ultrasound include computed tomography, x-ray diffraction computed tomography, x-ray radiography, x-ray diffraction radiography, terahertz radiography, harmonic testing, echo decay, eddy current inspection, surface resonance acoustic spectroscopy, white light interferometry, stereo vison ranging, and laser detection and ranging. Destructive methods, such as the integration of a physically unclonable function containing element can also be used, including optical, electrical, and electromagnetic physically unclonable functions.

Encryption may be employed at many steps in the authentication process, including transmission of data from the database 34 to any device, within the device, in the transmission of data to the database 34, in all data processing steps in processor 32 and/or in any other processor used to compare data from database 34, and in any permutation of aforementioned steps. Encrypted information can be directly compared or decrypted to enable comparison.

The reference data and interrogation data can be converted to a digital signature that captures the unique elements of the object 16. This digital signature can be encrypted, and it can incorporate additional information, such as the time and location of the interrogation of the object. The digital signature can be used for comparison to detect forgery or to authenticate the object.

The data in the database 34 can be connected to a blockchain block. It can also be recorded in a distributed ledger. This enables the connection of the object data to a digital verification method. To ensure that the interrogation data 36 can be used for authentication or forgery detection, it can be recorded in the database 34 in a manner that assigns it to the object 16 in order to use the data later for authentication inquiries.

The wavelength of the laser source 10 can be selected to target only certain materials in the object. One example is to select a wavelength that is primarily absorbed by metals, rather than polymers. In another example, the wavelength may be selected to be primely absorbed by pigments. In another example, the wavelength may be selected to be minimally absorbed by pigments. Measurements can be collected at more than one wavelength to compliment the robustness of the reference/interrogation data 38/36.

Additional benefit may be derived from recording the signal to noise ratio of the ultrasonic response during the interrogation. This can be used to determine the quality of the interrogation or to assist in determining threshold values for authentication. A variety of methods for concentrating, amplifying, or filtering acoustic signals can be used to improve the resolution, speed, or nondestructiveness of the presented invention. Acoustic lenses may be used to concentrate ultrasonic emission. Mechanical, electrical and/or computational filters such as band-pass filters, resonators, Wheatstone bridges, and Fast Fourier transform modules may be implemented to modify the acoustic signal and/or the resulting waveform. Static and/or dynamic reflectors may be used to direct, modify, and/or amplify acoustic emissions.

A variety of methods for creating desired ultrasonic propagation can be used to improve the quality of the detection signal. A profiled laser beam 12 may be used to create excitation and/or wave fronts in desired patterns, such as points, rings, lines, or regions with desired amplitude profiles. Phase shifting of the laser beam 12 spatially and/or temporally may be used to provide excitations and/or wave fronts with desired forms. The focal point of the laser beam 12 may be varied spatially and/or temporally to provide excitations and/or wave fronts with desired forms. Feedback about the diffraction, microstructure, optical diffusion, acoustic reflection, acoustic attenuation, or any other process or material property may be used as a factor for the determination of excitation beam shaping and transmission.

The present invention is ideal for authenticating art (such as sculptures, paintings, and drawings), jewelry, and any objects containing metal, clay, ceramic, epoxy, polymers, wood, pigment, binder, and/or combinations thereof.

Figure 3:
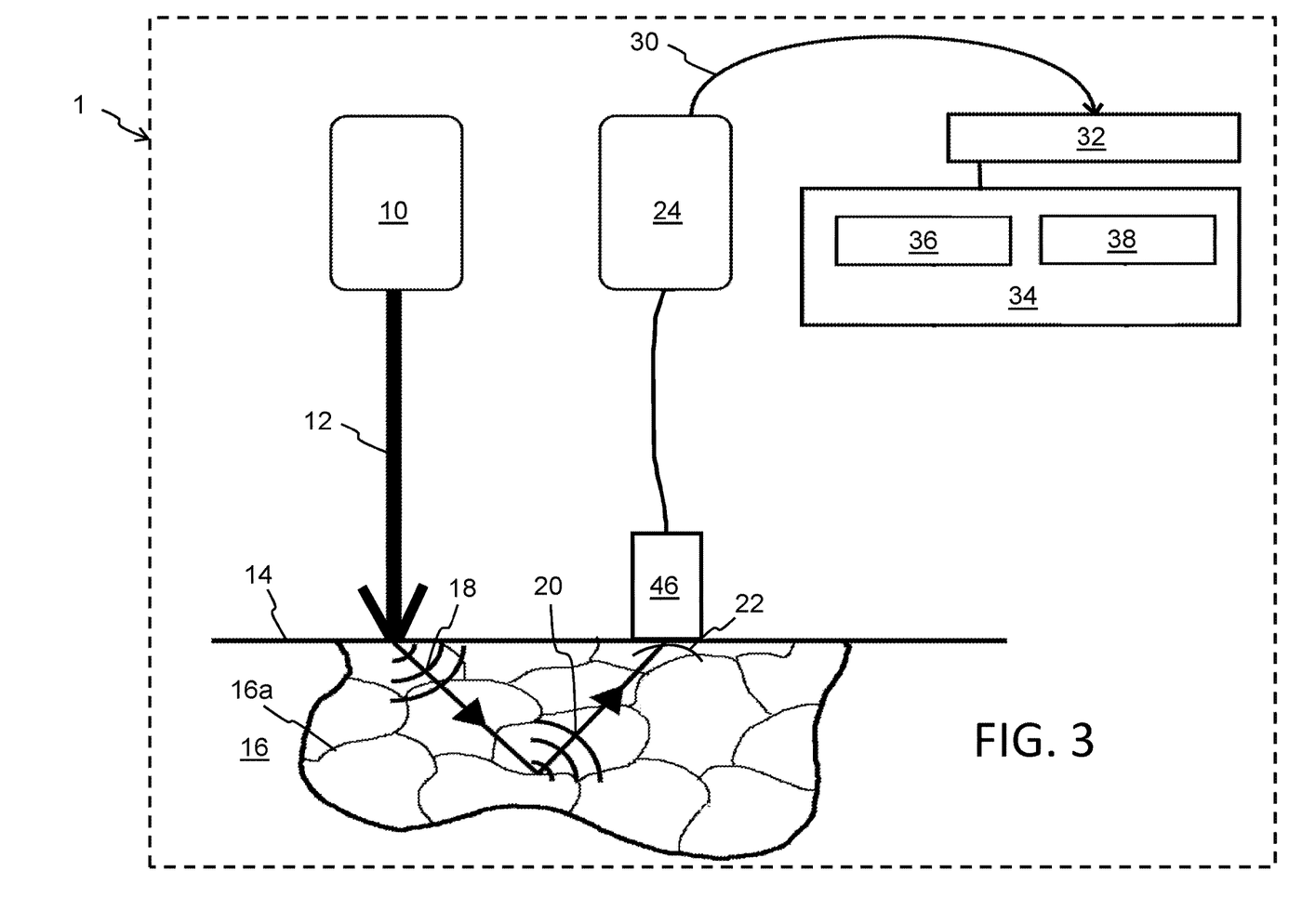
FIG. 3 is a schematic diagram of an alternate embodiment of the identification system of the present invention.

FIG. 3 illustrates an alternate embodiment for detector 24, which uses one or more transducers 46 preferably near or even in contact with the surface 14 to convert surface ultrasonic wave 22 into one or more electrical signals. If multiple transducers 46 are used, the transducers 46 may be configured at a variety of angles relative to the surface 14 to detect ultrasonic reflections from different directions. The transducer(s) 46 may be in a planar array, hemispherical array, parabolic array, hyperbolic array, line, circle, or any other desired shape.

Figure 4:
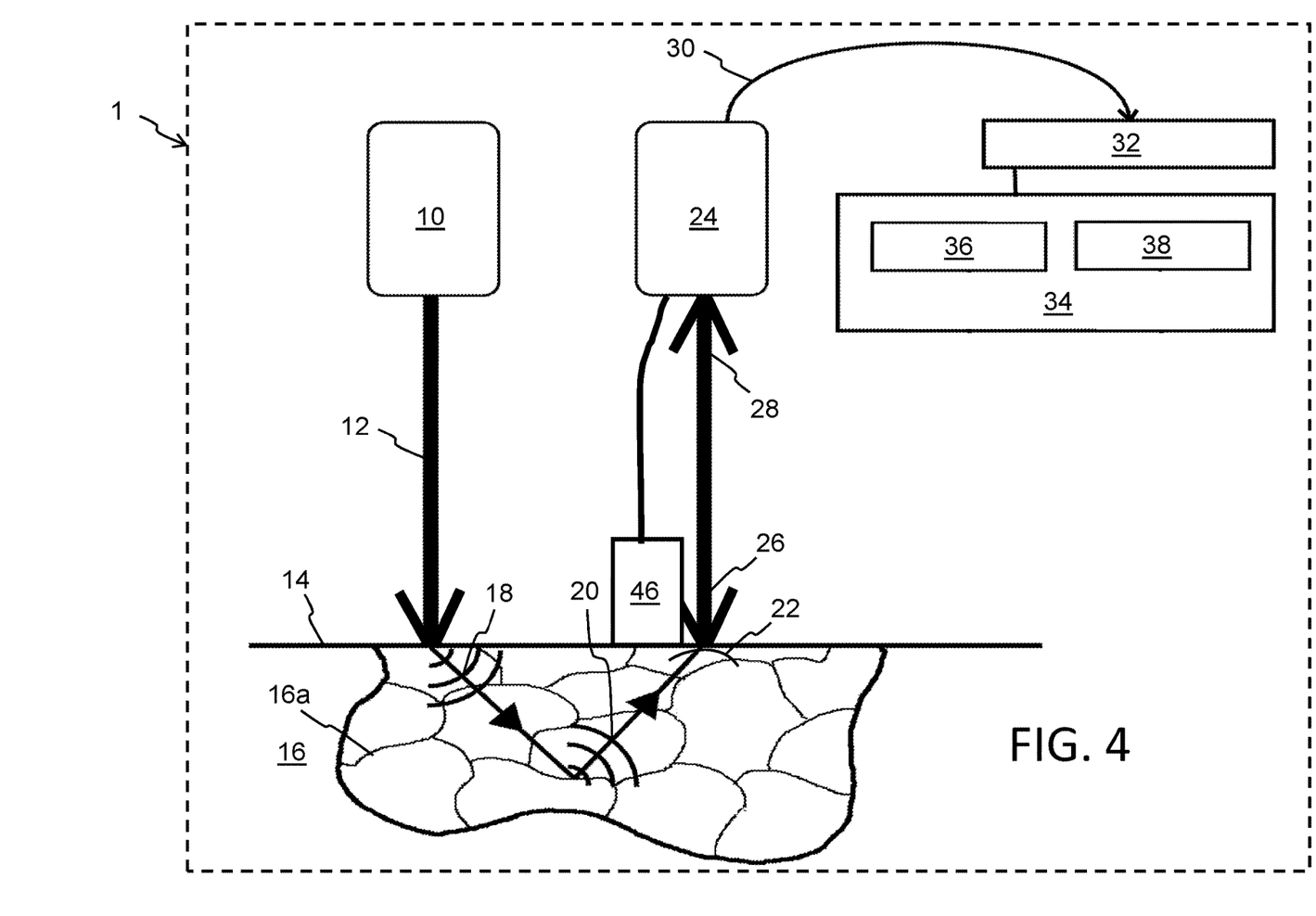
FIG. 4 is a schematic diagram of another alternate embodiment of the identification system of the present invention.

FIG. 4 illustrates another alternate embodiment for detector 24, which uses both optical detection (e.g., LDV based scattered light collection), and one or more of the transducers 46, to measure different aspects of the surface ultrasonic wave 22 and generate an appropriate detection signal 30 therefrom.

As set forth above, one option is to have the data used for authentication exclude contributions from the surface 14 of the object 16. Waves originating from the surface can be referred to as Rayleigh waves, which are surface waves, as opposed to bulk waves originated from deeper with the object. Excluding contributions from these surface waves reduces the file sizes of the reference/interrogation data 38/36, and can enhance comparisons between interrogations. An array of optical or physical contact transducers may be used to differentiate between surface waves and bulk waves, thus enabling the filtering of surface wave contributions from the detection signal. The frequency of the waves may also be used to filter surface waves using mechanical, electrical, and/or computational filters. Excitation with selected frequency and/or power to primarily excite surface waves may also be used to differentiate surface waves from bulk waves.

Figure 5:
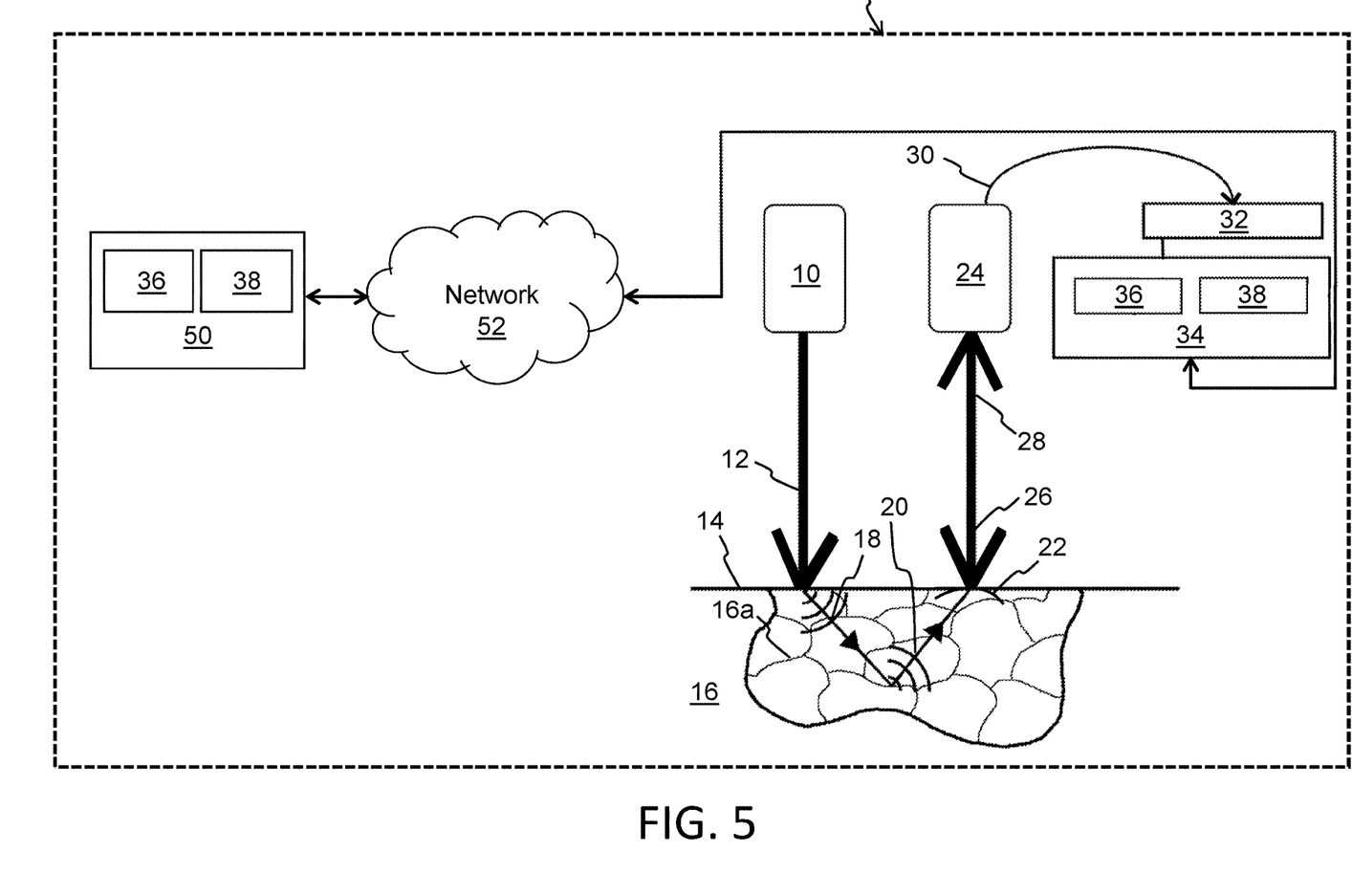
FIG. 5 is a schematic diagram of another alternate embodiment of the identification system of the present invention.

FIG. 5 illustrates another alternate embodiment, where a database 50 that is physically remote from the detector 24 is performing the comparison between the interrogation data 36 and the reference data 38 to determine authentication. Specifically, database 34 can be connected to database 50 via a network 52 (e.g., the Internet, cell network, etc.). Database 50 stores the interrogation data 36 and reference data 38 as received from database 34. Database 50 performs the comparison between the interrogation data 36 and the reference data 38 to determine authentication. The authentication results can then be conveyed back to database 34 via network 50. While FIG. 5 shows the interrogation data 36 and reference data 38 stored in both database 34 and database 50, the interrogation system 1 could instead be configured to send the interrogation data 36 and the reference data 38 to database 50 without storing it in database 34.

It is to be understood that the present invention is not limited to the embodiment(s) described above and illustrated herein, but encompasses any and all variations falling within the scope of any claims. For example, references to the present invention herein are not intended to limit the scope of any claim or claim term, but instead merely make reference to one or more features that may be covered by one or more of the claims. Materials, processes, and numerical examples described above are exemplary only, and should not be deemed to limit the claims. For example, a single detection signal 30 is shown, yet it could be many separate signals that collectively are used to generate/store the interrogation or reference data 36/38. Further, during a subsequent interrogation, the digital data generated from the detection signal need not be stored in the database 34, but rather could be compared directly as interrogation data against the reference data without the interrogation data ever being stored in the database 34. Finally, the preamble of any apparatus claim is intended to provide antecedent basis but not intended to otherwise be limiting.

What is claimed is:

1. A method comprising:
    directing a laser beam onto a surface of an object to induce a thermoelastic excitation in bulk material of the object without altering the surface of the object, wherein the laser beam is pulsed;
    detecting a surface ultrasonic wave at the surface of the object caused by the thermoelastic excitation;
    generating a detection signal using the detected surface ultrasonic wave;
    generating digital data using the detection signal;
    determining an authenticity of the object by comparing the digital data and reference data stored in a database; and
    generating the reference data by:
        directing a second laser beam onto a surface of the object to induce a second thermoelastic excitation in bulk material of the object, wherein the second laser beam is pulsed;
        detecting a second surface ultrasonic wave at the surface of the object caused by the second thermoelastic excitation;
        generating a second detection signal using the detected second surface ultrasonic wave;
        generating second digital data using the second detection signal; and
        storing the second digital data in the database as the reference data;
    wherein the determining the authenticity of the object includes determining that the object is authentic.

2. The method of claim 1, further comprising:
    storing the digital data in the database.

3. The method of claim 1, further comprising:
    performing spectral decomposition on the detection signal or the digital data to identify one or more portions of the detection signal or the digital data associated with a predetermined frequency range, wherein the determining an authenticity of the object is based on the one or more portions.

4. The method of claim 3, wherein the predetermined frequency range is above approximately 20 Mhz.

5. The method of claim 1, wherein the directing a laser beam includes directing the laser beam at multiple different locations on the surface of the object.

6. The method of claim 1, wherein the detecting a surface ultrasonic wave includes detecting the surface ultrasonic wave at multiple different locations on the surface of the object.

7. The method of claim 1, wherein:
    the detecting a second surface ultrasonic wave further comprises detecting the second surface ultrasonic wave at a plurality of discrete locations on the surface of the object; and
    the detecting a surface ultrasonic wave further comprises detecting the surface ultrasonic wave at some but not all of the plurality of discrete locations on the surface of the object.

8. The method of claim 1, wherein the detecting a surface ultrasonic wave further comprises:
    generating a detection laser beam for impinging on the surface of the object; and
    detecting light from the detection laser beam bouncing off the surface of the object;
    wherein the detecting of the surface ultrasonic wave uses the detected light from the detection laser beam bouncing off the surface of the object.

9. The method of claim 8, wherein the detecting light from the detection laser beam bouncing off the surface of the object further comprises detecting light from the detection laser beam bouncing off the surface of the object at two or more discrete angles relative to the surface of the object.

10. The method of claim 9, further comprising:
    deconvoluting portions of the detection signal or the digital data associated with the two or more discrete angles.

11. The method of claim 8, wherein:
    the generating of the detection laser beam further comprises directing the detection light beam at multiple discrete locations on the surface of the object;
    the detecting light from the detection laser beam further comprises detecting light from the detection laser beam bouncing off of the multiple discrete locations on the surface of the object.

12. The method of claim 11, further comprising:
    deconvoluting portions of the detection signal or the digital data associated with the multiple discrete locations.

13. The method of claim 11, further comprising:
    determining a velocity of the surface ultrasonic wave at each of the multiple discrete locations using the light detected from the detection laser beam bouncing off of the multiple discrete locations on the surface of the object.

14. The method of claim 8, wherein the detecting light from the detection laser beam bouncing off the surface of the object comprises using a Sagnac interferometer.

15. The method of claim 8, wherein the detecting a surface ultrasonic wave further comprises:
    detecting the surface ultrasonic wave using a transducer, wherein the generating of the detection signal is performed using the transducer and using the detected light from the detection laser beam bouncing off the surface of the object.

16. The method of claim 1, wherein the detecting a surface ultrasonic wave further comprises:
    detecting the surface ultrasonic wave using a transducer.

17. The method of claim 16, wherein the transducer is a phased array transducer.

* * * * *